United States Patent [19]
Ferrell

[11] Patent Number: 5,129,362
[45] Date of Patent: Jul. 14, 1992

[54] CATTLE ALLEY

[76] Inventor: Mark S. Ferrell, Rte. 1, Eustis, Nebr. 69028

[21] Appl. No.: 664,617

[22] Filed: Mar. 4, 1991

[51] Int. Cl.⁵ .......................... A61D 3/00; A01K 1/02
[52] U.S. Cl. .......................... 119/98; 119/20
[58] Field of Search .................. 119/98, 20, 155, 82

[56] References Cited

U.S. PATENT DOCUMENTS

| | | | |
|---|---|---|---|
| 699,988 | 5/1902 | Terrell et al. | 119/98 |
| 1,447,835 | 3/1923 | Coats . | |
| 2,557,477 | 6/1951 | Simon | 119/98 |
| 2,593,559 | 4/1952 | Heldenbrand | 119/99 |
| 2,733,685 | 2/1956 | LaRue | 119/98 |
| 2,804,046 | 8/1957 | Turner | 119/98 |
| 2,935,965 | 5/1960 | Smith | 119/82 |
| 4,121,538 | 10/1978 | Van Gilst et al. | 119/20 |
| 4,167,155 | 9/1979 | Wade et al. | 119/98 |

FOREIGN PATENT DOCUMENTS

| | | | |
|---|---|---|---|
| 225922 | 2/1958 | Australia | 119/98 |
| 247284 | 10/1962 | Australia | 119/98 |

Primary Examiner—Gene Mancene
Assistant Examiner—Thomas Price
Attorney, Agent, or Firm—Zarley, McKee, Thomte, Voorhees & Sease

[57] ABSTRACT

A cattle alley includes a forward and rearward generally inverted U-shaped frame connected by an elongated bar between the base portion of each U-shaped frame. A pair of side panels are pivotally mounted between one leg of each frame to form an alley therebetween. Each side panel has a generally horizontal base member pivotally mounted immediately adjacent the ground between one leg of each frame such that the side panel will pivot about the base member from a generally horizontal position to an upright vertical position. A lock mechanism at each end of each panel includes a retractable pin which may be inserted within one of a plurality of apertures in a channel mounted on each frame. The channels are oriented so that the side panels may be selectively pivoted to a variety of positions, such that the alley way may be widened for larger animals.

8 Claims, 4 Drawing Sheets

CATTLE ALLEY

TECHNICAL FIELD

The present invention relates to walk-through passage structures for animals, and more particularly to an improved cattle alley having adjustable and retractable panels.

BACKGROUND OF THE INVENTION

Walk-through passage structures are utilized for directing livestock from a pen or field to an animal restraining device or the like. The animal restraining devices take on many forms, including head gates and squeeze chutes and the like, and are utilized for branding, vaccination, or otherwise attending to an animal which requires that the animal be restrained.

While walk-through passage structures, or alleys, are well known in the prior art, they suffer several problems. Most prior art alleys utilize a plurality of fence posts mounted in the ground with fence panels affixed between the fence posts to form a passage. These fixed alleys were then utilized for every type of animal which the user was raising. Thus, small calves and large cattle would all utilize the same alley.

The problem with a single-width alley for both large and small animals occurs when running animals through the passageway. The animals will attempt to turn around within the alley if the passage is too wide. Once the animal gets turned around within the passage, it is very difficult to re-orient the animal and maintain movement through the alley. On the other hand, if the alley is designed with a width to accommodate calves, full grown cattle would not fit through the alley. Therefore two completely separate alleys having separate widths would be necessary.

Another problem with prior art passageways was that they would not permit easy access to animals within the passageway. Thus, if an animal stumbled and fell, the animal would be trampled before the consumer would be able to take off the fence panels to access the animal.

Finally, prior art alleys permitted animals to rear upwardly within the alley, thereby permitting the animal to potentially turn around or otherwise block the passageway.

It is therefore a general object of the present invention to provide an improved cattle alley.

Another object of the present invention is to provide a cattle alley which is adjustable in width for various sizes of animals.

A further object is to provide a cattle alley which permits simple and quick access to the passageway.

Yet another object of the present invention is to provide a cattle alley which prevents animals within the alley from rearing upwardly.

Still another object of the present invention is to provide a cattle alley which is simple to operate, sturdy in construction, and refined in appearance.

These and other objects will be apparent to those skilled in the art.

Summary of the Invention

The cattle alley of the present invention includes a forward and rearward generally inverted U-shaped frame connected by an elongated bar between the base portion of each U-shaped frame. A pair of side panels are pivotally mounted between one leg of each frame to form an alley therebetween. Each side panel has a generally horizontal base member pivotally mounted immediately adjacent the ground between one leg of each frame such that the side panel will pivot about the base member from a generally horizontal position to an upright vertical position. A lock mechanism at each end of each panel includes a retractable pin which may be inserted within one of a plurality of apertures in a channel mounted on each frame. The channels are oriented so that the side panels may be selectively pivoted to a variety of positions, such that the alley way may be widened for larger animals.

Description of the Preferred Embodiment

Figure 1:
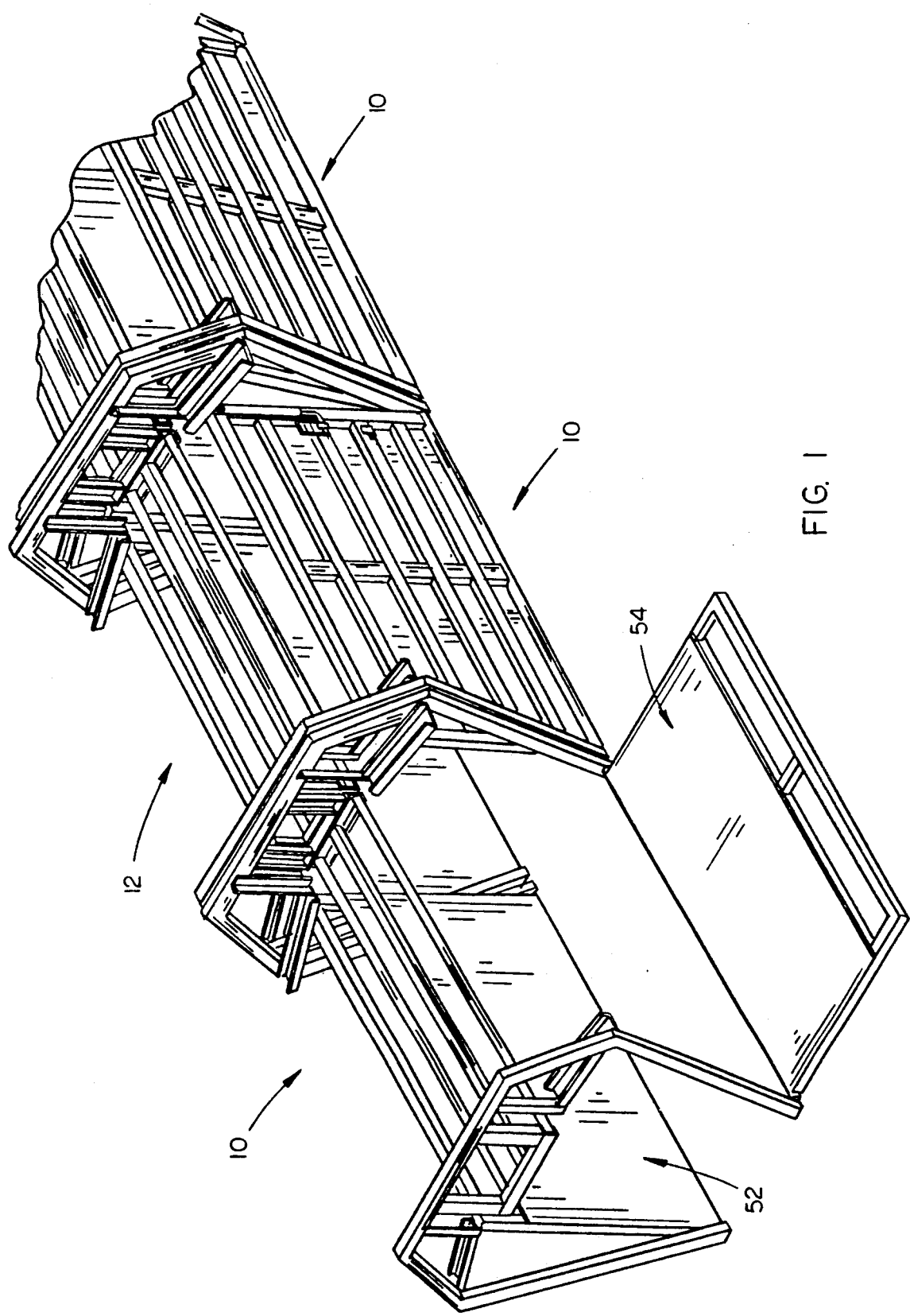
FIG. 1 is a perspective view of a walk-through passageway formed by a plurality of the cattle alleys of the present invention.

Referring now to the drawings, in which similar or corresponding parts are identified with the same reference numeral, and more particularly to FIG. 1, the cattle alley of the present invention is designated generally at 10 and may be combined end-to-end with other alleys 10 to form a longitudinal passageway designated generally at 12.

Figure 2:
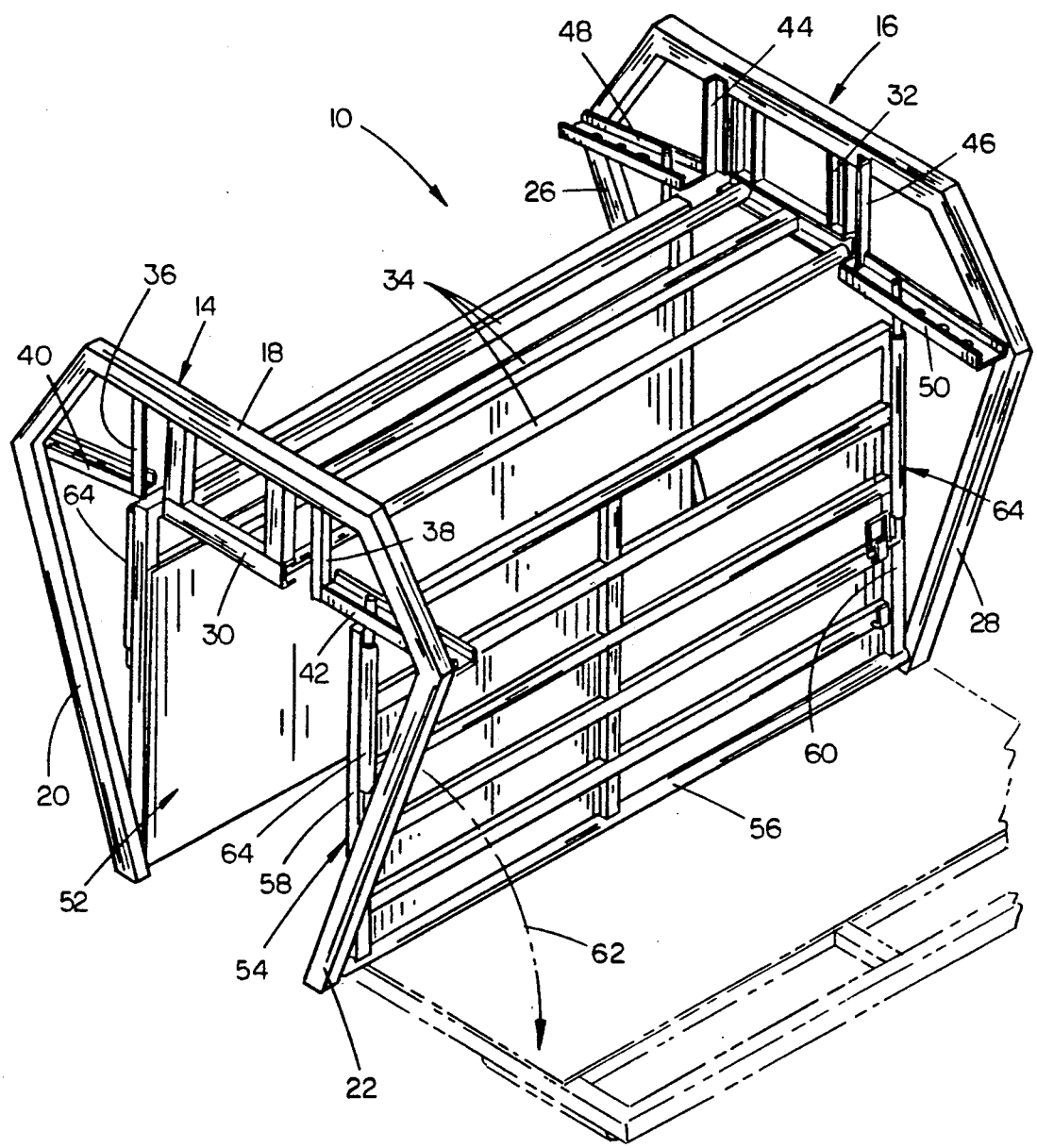
FIG. 2 is an enlarged perspective view of the cattle alley of the present invention.

Referring now to FIG. 2, cattle alley 10 includes a forward transverse frame 14 spaced apart and parallel to a rearward transverse frame 16 to form the forward and rearward ends of cattle alley 10. Forward frame 14 is an inverted generally U-shaped frame having a cross member 18 connected to a pair of depending ground-supported legs 20 and 22. Similarly, rearward frame 16 is an inverted generally U-shaped frame having a cross member 24 supported above the ground by a pair of depending ground-supported legs 26 and 28. Legs 20, 22, 26 and 28 diverge outwardly from the vertical, upwardly from the ground, as described in more detail hereinbelow.

Cross member 18 has a U-shaped frame 30 depending from the center thereof, which is oriented in alignment with a U-shaped frame 32 depending from the center of base member 24. Three spaced-apart, elongated bars 34 extend between U-shaped frames 30 and 32 so as to connect transverse frames 14 and 16.

Forward frame 14 has a pair of arms 36 and 38 depending from cross member 18 on opposite sides of U-shaped frame 30. A generally horizontally oriented channel 40 extends from the lower end of arm 36 and is connected to leg 20 of frame 14. A second generally horizontally oriented channel 42 is similarly located between the lower end of arm 38 and leg 22 of frame 14. Rearward frame 16 has a similar pair of depending arms 44 and 46 with corresponding channels 48 and 50 connected between arm 44 and frame leg 26, and arm 46 and frame leg 28, respectively.

A pair of side panels, designated generally at 52 and 54 are 1 operably mounted between forward and rearward frames to form a passageway when panels 52 and 54 are oriented generally vertically. Because panels 52 and 54 are identical, only one panel 54 will be described in detail herein.

Side panel 54 includes a generally rectangular tubular framework 55 having a longitudinal and horizontally oriented cross member 56 and forward and rearward vertical members 58 and 60, respectively. Base member 56 is pivotally mounted between the lower ends of legs 22 and 28 on forward and rearward frames 14 and 16 so as to be rotatable on its longitudinal axis. In this fashion, side panel 54 will pivot from the generally vertical position shown in FIG. 2 to the horizontal position against the ground shown in broken lines in FIG. 2 (the pivotal movement being shown by arrow 62).

Figure 4:
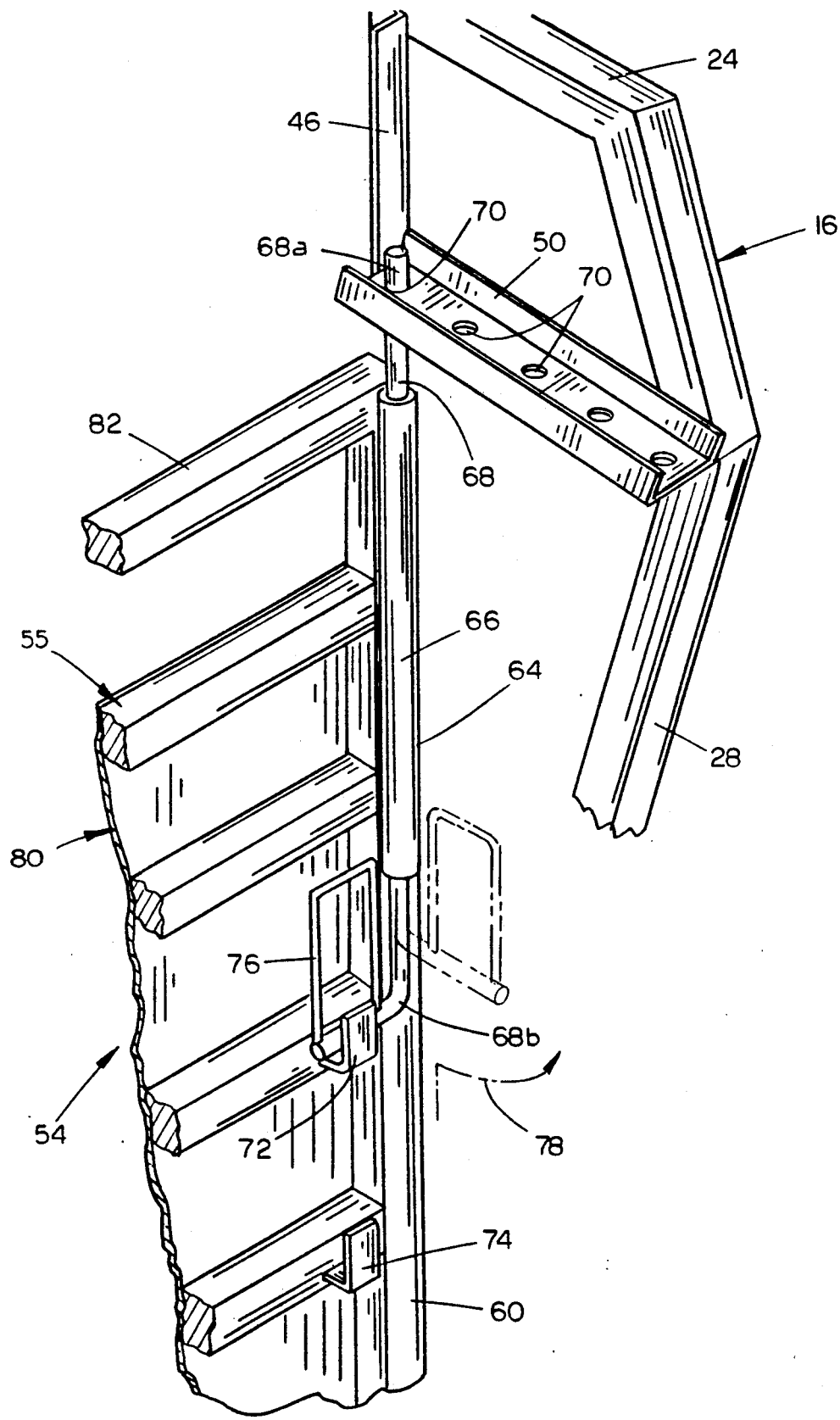
FIG. 4 is an enlarged perspective view of a portion of the device shown in FIG. 2.

Referring now to FIG. 4, side panel 54 may be locked in a plurality of generally vertical positions utilizing an operable lock mechanism 64. Lock mechanism 64 includes a sleeve 66 affixed to vertical member 60 with a rod 68 slidably journaled therethrough. The upper end 68a of rod 68 may be selectively journaled in one of a plurality of apertures 70 in channel 50. The lower end of rod 68 projects out the lower end of sleeve 56 and is bent at a right angle so as to be received within one of a pair of brackets 72 or 74 mounted on side panel 54. Bracket 72 is mounted spaced above bracket 74 at a position wherein the upper end 68a of rod 68 will project through one of apertures 70 when the lower end 68b of rod 68 rests within bracket 72. Bracket 74 is located a distance below bracket 72 such that rod 68 will not engage apertures 70 when the lower end of rod 68 rests within bracket 74. A handle 76 is mounted on the lower end 68b of rod 68 to permit the user to easily lift and rotate lower end 68b to disengage rod 68 from bracket 72 or 74, as shown by arrow 78.

Preferably, side panel 54 includes a generally rectangular plate 80 mounted on frame 55 and extending between vertical members 58 and 60. Preferably, plate 80 extends upwardly from cross member 56 to a height below upper horizontal member 82. Plate 80 prevents the animal from viewing outwardly of the alley 10, and thereby assists in keeping the animal moving through the alley.

As noted above, side panel 52 is identical to side panel 54 and is pivotally connected between legs 20 and 26 of frames 14 and 16. Thus, side panels 52 and 54 form a passageway through which an animal will pass, as shown in FIG. 2.

Figure 3:
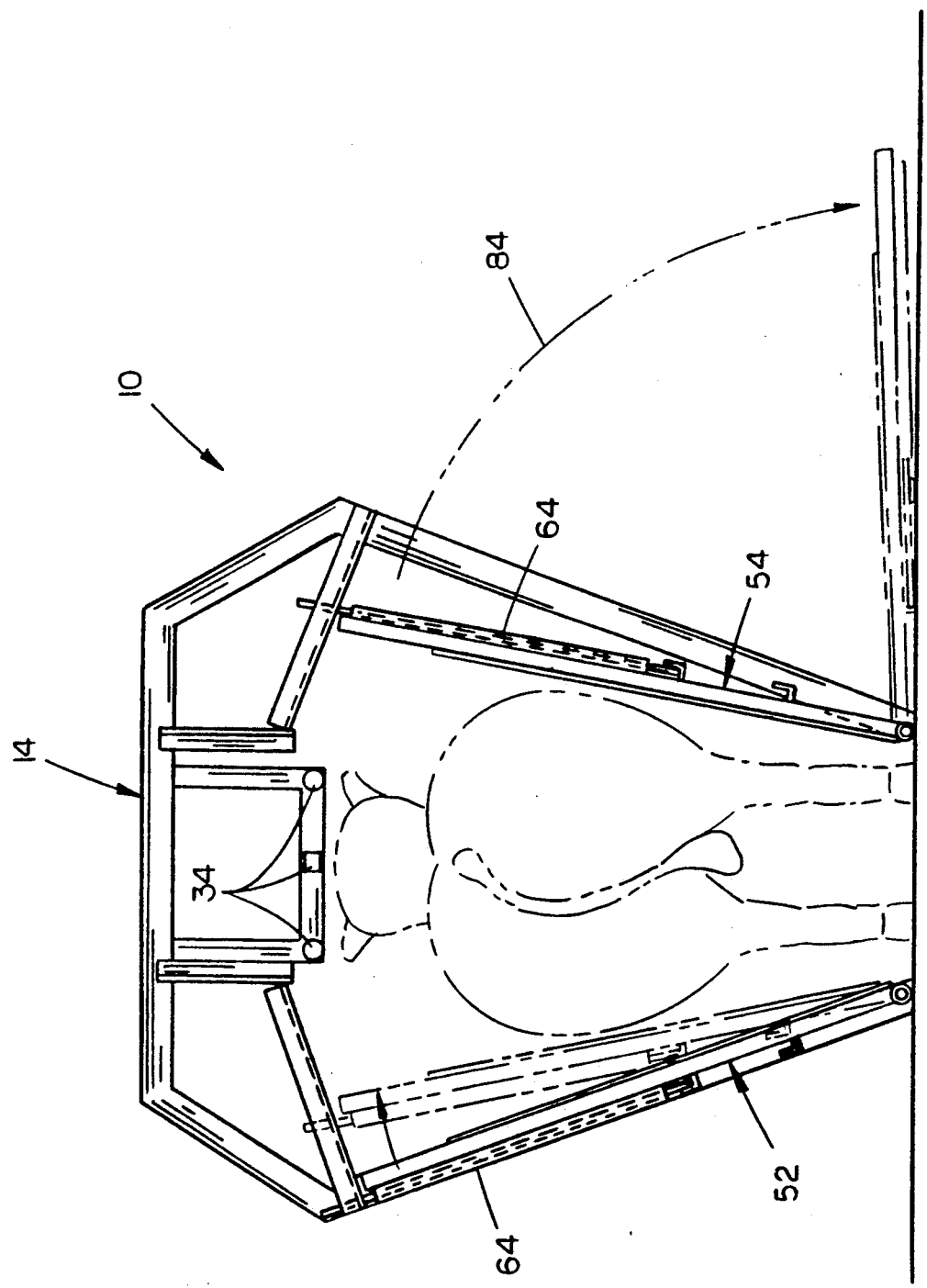
FIG. 3 is an end elevational view looking longitudinally through the cattle alley.

In operation, a plurality of cattle alleys 10 will typically be aligned end-to-end, as shown in FIG. 1, to form a long passageway. This passageway typically extends from a holding pen or the like to a "squeeze chute" or some similar device for holding the cattle for branding or vaccination. Once it is determined what size animal will be directed through the cattle 1 alley 10, side panels 52 and 54 may be adjusted to the specific animal, as shown in FIG. 3.

For smaller animals, side panels 52 and 54 would be locked in a vertical position. For larger animals side panels 52 and 54 may be tilted to a number of positions utilizing lock mechanism 64. Preferably, side panels 52 and 54 should be oriented in close proximity to the sides of the animal, so as to prevent the animal from turning around within alley 10. If the animal falls to the ground, or becomes otherwise disabled within cattle alley 10, side panels 52 and/or 54 may be pivoted completely downward to the ground, as shown by arrow 84. A forklift or tractor may then directly enter the alley 10 to remove the animal before the animal is trampled or harmed.

Elongated bars 34, positioned over the space in which the animal will be passing, are located so as to prevent the animals within the alley 10 from rearing upwardly.

Whereas the invention has been shown and described in connection with the preferred embodiment thereof, it will be understood that many modifications, substitutions and additions may be made which are within the intended broad scope of the appended claims. There has therefore been shown and described an improved cattle alley which accomplishes at least all of the above stated objects.

I claim:

1. A cattle alley, comprising:

a forward and rearward frame, each having a pair of legs projecting upwardly from the ground, each pair of legs connected at their upper ends by a cross member to form generally inverted U-shaped frames;

said forward and rearward frames connected by an elongated bar member and oriented generally transversely with respect to said bar member;

a first side panel, including an elongated generally horizontal base member, operably connected between a first leg on said forward and rearward frames for pivotal movement about said base member;

a second side panel, including an elongated generally horizontal base member, operably connected between a second leg on said forward and rearward frames for pivotal movement about said base member;

means on said first side panel for selectively connected connecting said first side panel to said forward and rearward frames for preventing pivotal movement about said base member, including:

said first panel having forward and rearward generally vertical end members;

at least said rearward end member having an operable lock mechanism thereon, including a selectively operable lock member;

at least said rearward frame having a lock member receiving means mounted thereon, adapted to engage said lock member to prevent pivotal movement of said fist side panel when the lock member is operated to an engaged position;

said lock member including a retractable pin operable between a fully extended engaged position, and a retracted release position;

said lock member receiving means including a channel member having at least one aperture therein for receiving said pin when in the engaged position; and means on said second side panel for selectively connecting said second side panel to said forward and rearward frames to prevent pivotal movement about said base member.

2. The cattle alley of claim 1, wherein said channel member has a plurality of apertures therein adapted to receive said pin, such that said first side panel is adjustable to different pivotal positions.

3. The cattle alley of claim 1, further comprising a second operable lock mechanism on the forward end member of said first panel.

4. The cattle alley of claim 1, wherein said means on said second panel for selectively connecting the panel to the forward and rearward frames includes:

said second panel having forward and rearward generally vertical end members;

at least said rearward end member having an operable lock mechanism thereon, the lock mechanism including a selectively operable lock member;

at least said rearward frame having a second lock member receiving means mounted thereon adapted to engage in said second panel lock member to prevent pivotal movement of said second panel when the second panel lock member is operated to an engaged position.

5. The cattle alley of claim 1, wherein said first and second side panels are fully pivotal to horizontal positions pivoted away from each other, and to vertical positions parallel to each other.

6. The cattle alley of claim 5, wherein the cross members on said first and second side panels are immediately adjacent to the ground to permit full access to the alley between the panels when the panels are pivoted to the horizontal position.

7. The cattle alley of claim 1, wherein said elongated bar member is located generally centrally on each said cross member of said forward and rearward frames and generally centrally between said first and second side panels at a height to prevent cattle from rearing upwardly.

8. A cattle alley, comprising:

a forward and rearward frame, each having a a pair of legs projecting upwardly from the ground, each pair of legs connected at their upper ends by a cross member to form generally inverted U-shaped frames;

said forward and rearward frames connected by an elongated bar member and oriented generally transversely with respect to said cross member;

a first side panel, including an elongated generally horizontal base member, operably connected between a first leg on said forward and rearward frames for pivotal movement about said base member;

a second side panel, including an elongated generally horizontal base member, operably connected between a second leg on said forward and rearward frames for pivotal movement about said base member;

means on said first side panel for selectively connecting said first side panel to said frames for preventing pivotal movement about said base member;

means on said second side panel for selectively connecting said second side panel to said frames to prevent pivotal movement about said base member; and said first and second side panels being connected to said frames to be fully pivotal to horizontal positions pivoted away from each other, and to vertical positions parallel to each other.

* * * * *